(12) United States Patent
Furumura et al.

(10) Patent No.: US 8,766,853 B2
(45) Date of Patent: Jul. 1, 2014

(54) METHOD FOR ADDING RF POWDER AND RF POWDER-ADDED BASE SHEET

(75) Inventors: Yuji Furumura, Yokohama (JP); Naomi Mura, Tokyo (JP); Shinji Nishihara, Kokubunji (JP); Katsuhiro Fujino, Yokohama (JP); Katsuhiko Mishima, Yokohama (JP); Susumu Kamihashi, Yokohama (JP)

(73) Assignee: Philtech Inc., Tokyo (JP)

( * ) Notice: Subject to any disclaimer, the term of this patent is extended or adjusted under 35 U.S.C. 154(b) by 420 days.

(21) Appl. No.: 12/516,497

(22) PCT Filed: Nov. 26, 2007

(86) PCT No.: PCT/JP2007/072747
§ 371 (c)(1),
(2), (4) Date: Oct. 20, 2009

(87) PCT Pub. No.: WO2008/065989
PCT Pub. Date: Jun. 5, 2008

(65) Prior Publication Data
US 2010/0090925 A1    Apr. 15, 2010

(30) Foreign Application Priority Data
Nov. 27, 2006   (JP) .................................. 2006-318531

(51) Int. Cl.
*H01Q 1/22*      (2006.01)
(52) U.S. Cl.
CPC ............... *H01Q 1/22* (2013.01); *H01Q 1/2208* (2013.01)
USPC .................................. 343/700 MS; 343/873
(58) Field of Classification Search
CPC ......... H01Q 1/22; H01Q 1/2208; G06K 7/00; G06K 19/00
USPC .......................... 343/700 MS, 873; 340/572.1
See application file for complete search history.

(56) References Cited

U.S. PATENT DOCUMENTS

| 3,946,206 A | 3/1976 | Darjany |
| 4,058,839 A | 11/1977 | Darjany |

(Continued)

FOREIGN PATENT DOCUMENTS

| JP | 61-006783 | 1/1986 |
| JP | 63-112198 | 5/1988 |

(Continued)

OTHER PUBLICATIONS

International Preliminary Report on Patentability issued Jun. 3, 2009 for PCT/JP2007/072749 (English translation).

(Continued)

*Primary Examiner* — Dameon E Levi
*Assistant Examiner* — Jennifer F Hu
(74) *Attorney, Agent, or Firm* — Foley & Lardner LLP (57) ABSTRACT

A method is provided for adding an RF powder to a sheet-like object having a high property value, such as a variety of cards, paper money, and securities. The RF powder makes it very difficult to produce, for example, counterfeit cards, documents and bills. Also, an RF powder-added base sheet to which the RF powder has been added is provided. In the method for adding the RF powder, the RF powder includes a plurality of RF powder particles 11 and is disposed on a surface of a base sheet 10 to add the RF powder to the base sheet. Each RF powder particle 11 has a magnetic field coupling circuit element in a high frequency magnetic field having a specific frequency. The RF powder is disposed on a surface of a base sheet by a printing technique. The RF powder-added base sheet 10 includes an RF powder including a plurality of RF powder particles 11 disposed within a printed object on a surface of a base sheet. Each RF powder particle 11 has a magnetic field coupling circuit element in a high frequency magnetic field having a high frequency.

21 Claims, 9 Drawing Sheets

(56) References Cited

U.S. PATENT DOCUMENTS

| | | | |
|---|---|---|---|
| 4,745,401 A | 5/1988 | Montean | |
| 5,204,681 A | 4/1993 | Greene | |
| 5,291,205 A | 3/1994 | Greene | |
| 5,497,952 A | 3/1996 | Iding | |
| 5,518,937 A * | 5/1996 | Furumura et al. | 438/309 |
| 5,581,257 A | 12/1996 | Greene et al. | |
| 5,808,587 A | 9/1998 | Shima | |
| 6,072,394 A * | 6/2000 | Hasegawa et al. | 340/572.5 |
| 6,285,284 B1 | 9/2001 | Soe et al. | |
| 6,445,271 B1 | 9/2002 | Johnson | |
| 6,479,384 B2 | 11/2002 | Komai et al. | |
| 6,642,827 B1 | 11/2003 | McWilliams et al. | |
| 6,758,397 B2 | 7/2004 | Catan | |
| 6,966,488 B2 | 11/2005 | Yamagami | |
| 6,998,696 B2 | 2/2006 | Casper et al. | |
| 7,061,083 B1 * | 6/2006 | Usami et al. | 257/679 |
| 7,102,522 B2 | 9/2006 | Kuhns | |
| 7,158,033 B2 | 1/2007 | Forster | |
| 7,227,504 B2 | 6/2007 | Deguchi et al. | |
| 7,288,320 B2 | 10/2007 | Steenblik et al. | |
| 7,305,223 B2 | 12/2007 | Liu et al. | |
| 7,317,420 B2 * | 1/2008 | Aisenbrey | 343/700 MS |
| 7,405,665 B2 | 7/2008 | Yamazaki | |
| 7,427,577 B2 | 9/2008 | Tang et al. | |
| 7,508,305 B2 * | 3/2009 | Yamazaki et al. | 340/572.1 |
| 7,551,054 B2 | 6/2009 | Mizuno et al. | |
| 7,557,757 B2 | 7/2009 | Deavours et al. | |
| 7,623,036 B2 | 11/2009 | Onderko et al. | |
| 7,767,551 B2 | 8/2010 | Arita et al. | |
| 7,876,189 B2 | 1/2011 | Gilmartin et al. | |
| 7,893,837 B2 | 2/2011 | Yamazaki et al. | |
| 7,984,849 B2 | 7/2011 | Berghel et al. | |
| 7,990,137 B2 | 8/2011 | Antoku | |
| 2002/0163479 A1 | 11/2002 | Lin et al. | |
| 2003/0037240 A1 | 2/2003 | Yamagishi et al. | |
| 2003/0095032 A1 | 5/2003 | Hoshino et al. | |
| 2003/0136828 A1 | 7/2003 | Takesada et al. | |
| 2005/0194591 A1 | 9/2005 | Usami et al. | |
| 2006/0044111 A1 | 3/2006 | Kollar et al. | |
| 2006/0044769 A1 | 3/2006 | Forster et al. | |
| 2006/0202269 A1 | 9/2006 | Suzuki et al. | |
| 2007/0138251 A1 | 6/2007 | Mattlin et al. | |
| 2007/0176622 A1 | 8/2007 | Yamazaki | |
| 2007/0210364 A1 | 9/2007 | Kato et al. | |
| 2008/0042168 A1 | 2/2008 | Watanabe et al. | |
| 2008/0130018 A1 | 6/2008 | Steenblik et al. | |
| 2008/0303735 A1 | 12/2008 | Fujimoto et al. | |
| 2009/0206151 A1 | 8/2009 | Morita | |
| 2010/0026441 A1 | 2/2010 | Wedley | |
| 2010/0066619 A1 * | 3/2010 | Furumura et al. | 343/742 |
| 2010/0067166 A1 * | 3/2010 | Furumura et al. | 361/270 |
| 2011/0063184 A1 | 3/2011 | Furumura et al. | |

FOREIGN PATENT DOCUMENTS

| | | |
|---|---|---|
| JP | 63-261851 | 10/1988 |
| JP | 03-087027 | 4/1991 |
| JP | 05-101249 | 4/1993 |
| JP | 06-350495 | 12/1994 |
| JP | 07-263935 | 10/1995 |
| JP | 08-022514 | 1/1996 |
| JP | 08-305970 | 11/1996 |
| JP | 10-069533 | 3/1998 |
| JP | 10-171951 | 6/1998 |
| JP | 11-328493 | 11/1999 |
| JP | 2000-269166 | 9/2000 |
| JP | 2001-230220 | 8/2001 |
| JP | 2002-271122 | 9/2002 |
| JP | 2002-333913 | 11/2002 |
| JP | 2003-058659 | 2/2003 |
| JP | 2003-087044 | 3/2003 |
| JP | 2003-157477 | 5/2003 |
| JP | 2003-179005 | 6/2003 |
| JP | 2003-187195 | 7/2003 |
| JP | 2003-216908 | 7/2003 |
| JP | 2003-242472 | 8/2003 |
| JP | 2004-079746 | 3/2004 |
| JP | 2004-139405 | 5/2004 |
| JP | 2004-159960 | 6/2004 |
| JP | 2005-020058 | 1/2005 |
| JP | 2005-050997 | 2/2005 |
| JP | 2005-183741 | 7/2005 |
| JP | 2005-197630 | 7/2005 |
| JP | 2005-208775 | 8/2005 |
| JP | 2005-216099 | 8/2005 |
| JP | 2005-284333 | 10/2005 |
| JP | 2005-285109 | 10/2005 |
| JP | 2005-340658 | 12/2005 |
| JP | 2005-340791 | 12/2005 |
| JP | 2006-012086 | 1/2006 |
| JP | 2006-027745 | 2/2006 |
| JP | 2006-041986 | 2/2006 |
| JP | 2006-066899 | 3/2006 |
| JP | 2006-180043 | 7/2006 |
| JP | 2006-203852 | 8/2006 |
| JP | 2006-277667 | 10/2006 |
| JP | 2006-285958 | 10/2006 |
| WO | WO-00/36555 | 6/2000 |
| WO | WO-2008/099955 | 8/2008 |

OTHER PUBLICATIONS

International Preliminary Report on Patentability issued Jun. 3, 2009 for PCT/JP2007/072750 (English translation).

International Preliminary Report on Patentability issued Jun. 3, 2009 for PCT/JP2007/072751 (English Translation).

International Preliminary Report on Patentability issued Jun. 3, 2009 for PCT/JP2007/072752 (English translation).

International Preliminary Report on Patentability issued Jun. 30, 2009 for PCT/JP2007/072746 (English Translation).

International Search Report mailed Feb. 19, 2008 for PCT/JP2007/072746 (English translation).

International Preliminary Report on Patentability issued Jul. 9, 2009 for PCT/JP2007/074108 (English translation).

Usami, Mitsuo, An ultrasmall RFID chip:m-chip, Oyo Buturi, vol. 73, No. 9, pp. 1179-1183 (2004).

Usami, Mitsuo, et al., Ubiquitous Technology IC Tag, first edition, Ohmsha, Ltd., pp. 115, Mar. 15, 2005.

Hitachi Pamphlet, World's smallest and thinnest 0.15×0.15 mm, 7.51-Im thick RFID IC chip, Feb. 6, 2006, http://www.hitachi.com/New/cnews/060206.html, 3 pages.

Non-final Office Action received for U.S. Appl. No. 12/516,705 dated Mar. 19, 2012.

Notice of Allowance received for U.S. Appl. No. 12/516,493 dated Feb. 23, 2012.

Notice of Allowance for U.S. Appl. No. 12/521,244, mailed on Mar. 29, 2012.

"RFID 'Powder'—World's Smallest RFID Tag," Hitachi, Technovelgy LLC, Feb. 14, 2007, http://www.technovelgy.com/ct/Science-Fiction-News.asp?NewsNum=939, 3 pp.

International Preliminary Report on Patentability for PCT/JP2007/072747, mailed Jun. 11, 2009 (English Translation).

International Preliminary Report on Patentability for PCT/JP2007/072748, mailed Jun. 11, 2009 (English Translation).

International Search Report and Written Opinion for PCT/JP2007/072747, mailed Jan. 29, 2008 (English Translation).

International Search Report and Written Opinion for PCT/JP2007/072748, mailed Feb. 19, 2008 (English Translation).

International Search Report and Written Opinion for PCT/JP2007/072749 mailed Feb. 19, 2008 (English Translation).

International Search Report and Written Opinion for PCT/JP2007/072750, mailed Feb. 26, 2008 (English Translation).

International Search Report and Written Opinion for PCT/JP2007/072751, mailed Feb. 5, 2008 (English Translation).

International Search Report and Written Opinion for PCT/JP2007/072752, mailed Feb. 12, 2008 (English Translation).

Junko Yoshida, "Euro bank notes to embed RFID chips by 2005," EETimes News and Analysis, Dec. 19, 2001, http://www.eetimes.com/story/OEG20011219S0016, 3 pp.

(56) References Cited

OTHER PUBLICATIONS

Li Yang et al., "Design and Development of Novel Miniaturized UHF RFID Tags on Ultra-low-cost Paper-based Substrates," Proceedings of Asia-Pacific Microwave Conference 2006, vol. 12, Issue 15, Dec. 2006, pp. 1493-1496.
N Mura et al., "RF-Powder : Fabrication of 0.15-mm Si-powder Resonating at Microwave Frequencies," IEEE European Microwave Conference, 2007, vol. 9, Issue 12, Oct. 2007, pp. 392-395.
Non-Final Office Action for U.S. Appl. No. 12/516,643, mailed on Jan. 12, 2012.
Non-final Office Action received for U.S. Appl. No. 12/516,500 dated Feb. 3, 2012.
Notice of Allowance for U.S. Appl. No. 12/516,493, mailed on Jan. 20, 2012.
Notice of Allowance for U.S. Appl. No. 12/521,244, mailed on Jan. 26, 2012.
Restriction Requirement for U.S. Appl. No. 12/516,705, mailed on Dec. 12, 2011.
Tetsuo Nozawa, "Hitachi Achieves 0.05-mm Square Super Micro RFID Tag, 'Further Size Reductions in Mind'," Tech-On Nikkei Business Publications, Feb. 20, 2007, http://techon.nikkeibp.com.jp/english/NEWS_EN/20070220/127959/, 2 pp.
Tim Hornyak, "RFID Powder," Scientific American, Inc., Feb. 2008, pp. 68-71.
W Choi et al., "RFID Tag Antenna with a Meandered Dipole and Inductively Coupled Feed," IEEE Antennas and Propagation Society International Symposium 2006, vol. 9, Issue 14, Jul. 2006, pp. 619-622.
Winston Chai, "Euro notes to get RFID tags from Hitachi?," CBS Interactive Limited, May 23, 2003, http://networks.silicon.com/mobile/0,39024665,10004316,00.htm, 8 pp.
Non-Final Office Action for U.S. Appl. No. 12/516,500, mailed on Sep. 29, 2011, 15 pp.
Non-Final Office Action for U.S. Appl. No. 12/521,244, mailed on Nov. 8, 2011, 11 pp.
Notice of Allowance for U.S. Appl. No. 12/516,493, mailed on Oct. 17, 2011, 14 pp.
Non-Final Office Action issued for U.S. Appl. No. 12/516,648, mailed on May 31, 2013, 29 pp.
Notice of Allowance for U.S. Appl. No. 12/516,500, mailed on Oct. 26, 2012, 9 pp.
Notice of Allowance for U.S. Appl. No. 12/516,500, mailed on Feb. 26, 2013, 10 pp.
Final Office Action issued for U.S. Appl. No. 12/516,643, mailed on Aug. 17, 2012, 14 pp.
Notice of Allowance for U.S. Appl. No. 12/516,705, mailed on Jul. 18, 2012.
Non-Final Office Action for U.S. Appl. No. 12/516,643, mailed on Jun. 12, 2013, 15 pp.
Non-Final Office Action issued for U.S. Appl. No. 12/516,500, mailed on Jun. 14, 2012.
Notice of Allowance issued for U.S. Appl. No. 12/516,715, mailed on Dec. 16, 2013, 7 pp.
Final Office Action for U.S. Appl. No. 12/516,648, mailed on Nov. 26, 2013, 16 pp.
Non-final Office Action received for U.S. Appl. No. 12/516,715 dated Sep. 16, 2013.
International Search Report for Intl. Pat. Appln. No. PCT/JP2007/074108, mailed on Feb. 12, 2008, 1 page.
Saha, et al., "A CMOS Monocycle Pulse Generation Circuit in a Ultra-Wideband Transmitter for Intra/Inter Chip Wireless Interconnection," Japanese Journal of Applied Physics, 2005, vol. 44, No. 4B, pp. 2104-2108.

\* cited by examiner

METHOD FOR ADDING RF POWDER AND RF POWDER-ADDED BASE SHEET

CROSS-REFERENCE TO RELATED APPLICATIONS

The present application is a U.S. national stage application claiming the benefit of International Application No. PCT/JP2007/072747, filed on Nov. 26, 2007, which claims the benefit of Japanese Application No. 2006-318531, filed on Nov. 27, 2006, the entire contents of which are incorporated herein by reference in their entireties.

TECHNICAL FIELD

The present invention relates to methods for adding an RF powder and RF powder-added base sheets. In particular, the invention relates to a method for adding a plurality of RF powder particles capable of reading information in a high frequency electromagnetic field to a base sheet, and relates to a base sheet to which the RF powder particles have been added.

BACKGROUND ART

The IC tag is considered to be a product positioned at the entrance to the ubiquitous age. Name tags, Suica cards, FeRAM cards, and the like have been developed for RF-ID (microminiaturized radio frequency identification). Many people expect that the IC tag market must grow greatly. However, the IC tag market has not yet grown more than expected. This is because there are social problems that should be overcome, such as cost, security, and confidentiality.

It is also expected that the RF-ID technology is applied to the identification of written property, such as paper money and securities. Since the problem of counterfeit bills becomes significant, an IC tag may be embedded in paper money to solve such a problem. However, IC tags are expensive and large. It is therefore difficult to embed an IC tag.

The price of IC tags can be reduced by miniaturizing IC tag chips. The miniaturization of IC tag chips results in an increased number of tag chips produced from a single wafer. So far a 0.4 mm square IC tag chip has been developed. This IC tag chip can store 128-bit memory data that can be read by microwaves of 2.45 GHz (see, for example, Non-patent Document 1).

Radio frequency automatic identification (RF/AID) systems have also been developed which use elements other than the IC tag and can be applied to identification of paper money and credit cards. Patent Document 1, for example, uses a plurality of resonators resonating at a plurality of radio frequencies, fixed in a random fashion onto a paper or plastic substrate. The plurality of resonators are of passive solid. If quartz is used, the resonance frequency is varied depending on the crystal orientation and the size of the quartz crystal. Hence, resonators having different shapes resonate at different frequencies. The above passive solid resonator includes a thin dipole made of an elongated metal. More specifically, the passive solid resonator is made of a quartz family, such as quartz crystal. For a radio frequency target, a plurality of resonators disposed on a substrate resonate when they are irradiated with electromagnetic waves having a radio frequency. The positions of the plurality of resonators can be known by detecting this resonance. The target is thus identified.

Patent Document 1: Japanese Unexamined Patent Application Publication No. 10-171951
Non-patent Document 1: Mitsuo USAMI "An ultrasmall RFID chip: μ-chip", OYO BUTSURI, Vol. 73, No. 9, 2004, pp. 1179-1183

DISCLOSURE OF INVENTION

Problems to be Solved by the Invention

For embedding IC tags in a card, a single IC tag is generally used for one card. However, for example, a paper money to which only one IC tag is attached is very simple in structure. Accordingly, it can be easy to produce a counterfeit bill.

Accordingly, an object of the present invention is to provide a method for adding an RF powder to sheet-like objects having high property values, such as a variety of cards, paper money, and securities, wherein the RF powder can make it very difficult to produce counterfeit cards, documents and bills or the like. The object is also to provide an RF powder-added base sheet to which the RF powder has been added.

Means for Solving the Problems

In order to accomplish the object of the invention, the method for adding an RF powder and the RF powder-added base sheet according to the present invention have the following features.

The method for adding an RF powder according to the present invention is intended to add an RF powder to a base sheet (hereinafter simply referred to as "sheet", omitting the term "base"). The RF powder includes a plurality of RF powder particles. Each RF powder particle has a magnetic field coupling circuit element including a coil and a capacitor that respond to a high frequency magnetic field having a specific frequency (the magnetic field coupling element hereinafter may be referred to as antenna circuit element). In the method, the RF powder is disposed on a surface of the sheet.

In the method, preferably, the RF powder is disposed on the surface of the sheet by a printing technique. More preferably, the RF powder is disposed together with a print ink having a specific color on the surface of the sheet.

In the method, the RF powder is disposed on the surface of the sheet within a region defined by an object drawn in the ink. The object is a letter, a numeral, or a code.

Preferably, the RF powder is disposed on both surfaces of the sheet. In addition, the RF powder is preferably disposed so as to be embedded in the surface of the sheet.

In the method, the plurality of RF powder particles contained in the RF powder respond to the same frequency, and hence the specific frequency is set to a single value. Alternatively, the plurality of RF powder particles contained in the RF powder may respond to different frequencies, and hence a plurality of frequencies are set. The RF powder may contain dummy RF powder particles not responding to high frequency electromagnetic fields.

The RF powder-added base sheet according to the present invention includes an RF powder including a plurality of RF powder particles, each having a magnetic field coupling antenna circuit element that responds to a high frequency electromagnetic field having a specific frequency. The RF powder is disposed on a surface of a base sheet, in a state in which the RF powder is contained in a printed object.

The printed object has a specific color. The printed object is preferably a letter, a numeral, or a code. Preferably, the printed object is provided at both surfaces of the sheet.

In addition, the RF powder is preferably disposed so as to be embedded in the surface of the sheet.

Preferably, the plurality of RF powder particles contained in the RF powder respond to the same frequency, and hence the specific frequency is set to a single value. Alternatively, the plurality of RF powder particles contained in the RF powder may respond to different frequencies, and hence a plurality of frequencies are set. The RF powder may contain dummy RF powder particles not responding to high frequency electromagnetic fields.

Advantages

The present invention produces the following effects.

First, it can be accurately determined whether a base sheet is genuine or not because the base sheet, which may be made of paper or plastic, is provided with an RF powder responding to a high frequency electromagnetic field of a specific frequency on the surface. Consequently, if it is applied to paper money, it becomes impossible to produce counterfeit bills. By disposing the RF powder on the surface of a base sheet, frequency information is given to the base sheet.

Second, the RF powder can be easily added to the base sheet because the RF powder is disposed on a surface of the base sheet, in a state in which the RF powder is contained in a shape written by printing. Since the RF powder is disposed on the surface of the base sheet in the region defined by the written shape, such as a letter, a figure, or a code, the user can easily know whether the RF powder is present, in association with written shape. Also, by providing a specific color to the written shape, it can easily be determined in association with the color whether or not the RF powder is present.

Third, since the RF powder particles contained in the RF powder may respond to the same specific frequency or different specific frequencies, the RF powder added to a base sheet can be used in a wide range of application.

Fourth, when the RF powder contains dummy RF powder particles among the RF powder particles, persons who are going to make counterfeit base sheets, such as counterfeit bills, are confused and it becomes difficult to make counterfeit bills or the like.

BEST MODES FOR CARRYING OUT THE INVENTION

Preferred embodiments (examples) of the present invention will now be described with reference to attached drawings.

Figure 1:
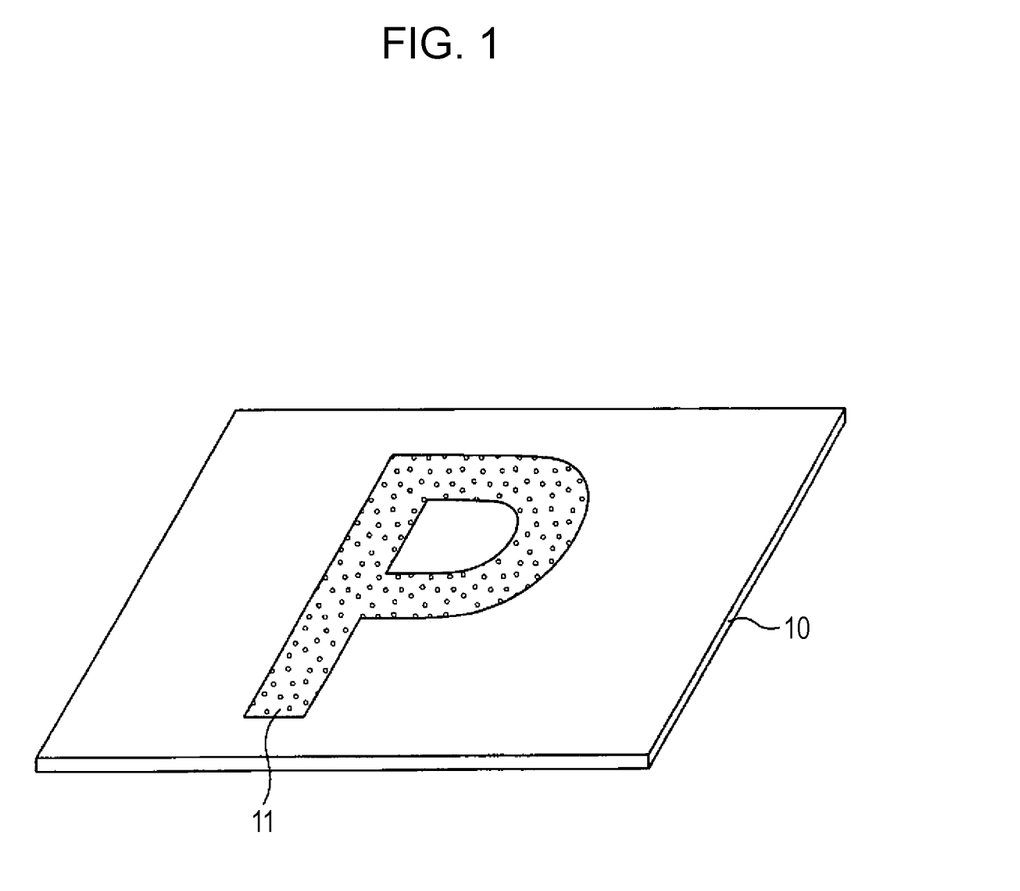
FIG. 1 is a perspective view of an RF powder-added sheet according to a first embodiment of the invention.

FIG. 1 is a perspective view of an RF powder-added base sheet according to a first embodiment of the invention. In FIG. 1, the base sheet 10 is provided with, for example, a large number of RF powder particles 11 on its upper surface. The large number of RF powder particles 11 are disposed in the region representing a letter "P". The letter "P" may be, for example, a shape written by printing. The letter "P" is written in a print ink, a coating ink, or the like. The large number of RF powder particles 11 are contained in an ink solution. When the letter "p" is written in the ink solution and the liquid component of the ink is dried, the large number of RF powder particles 11 adhere to and are thus deposited on the surface of the sheet 10 in the region in which a letter "P" has been written.

The sheet 10 may be, for example, a paper money. The ink has a specific color. The written shape may be a letter, a figure, or a code. Each RF powder particle 11 contains an antenna circuit element and responds to a high frequency electromagnetic field having a specific frequency.

The large number of RF powder particles 11 are collectively treated as a powder in practice, hence constituting the RF powder. The RF powder particles 11 are present on the surface of the sheet 10 so as to form the letter P, thus dispersing over the P-shaped region. A sheet 10 including the large number of RF powder particles on or in the surface or the like as described above is hereinafter referred to as an "RF powder-added sheet 10".

The "RF powder" refers to a powder constituted of a large number of particles, each having an electrical circuit element that transmits and receives signals to or from an external reader by radio (in a high frequency electromagnetic field). The particles are generally treated as a powder collectively.

The concrete structure of one of the large number of RF powder particles (11) will now be described as an RF powder particle 21 with reference to FIGS. 2 to 4.

Figure 2:
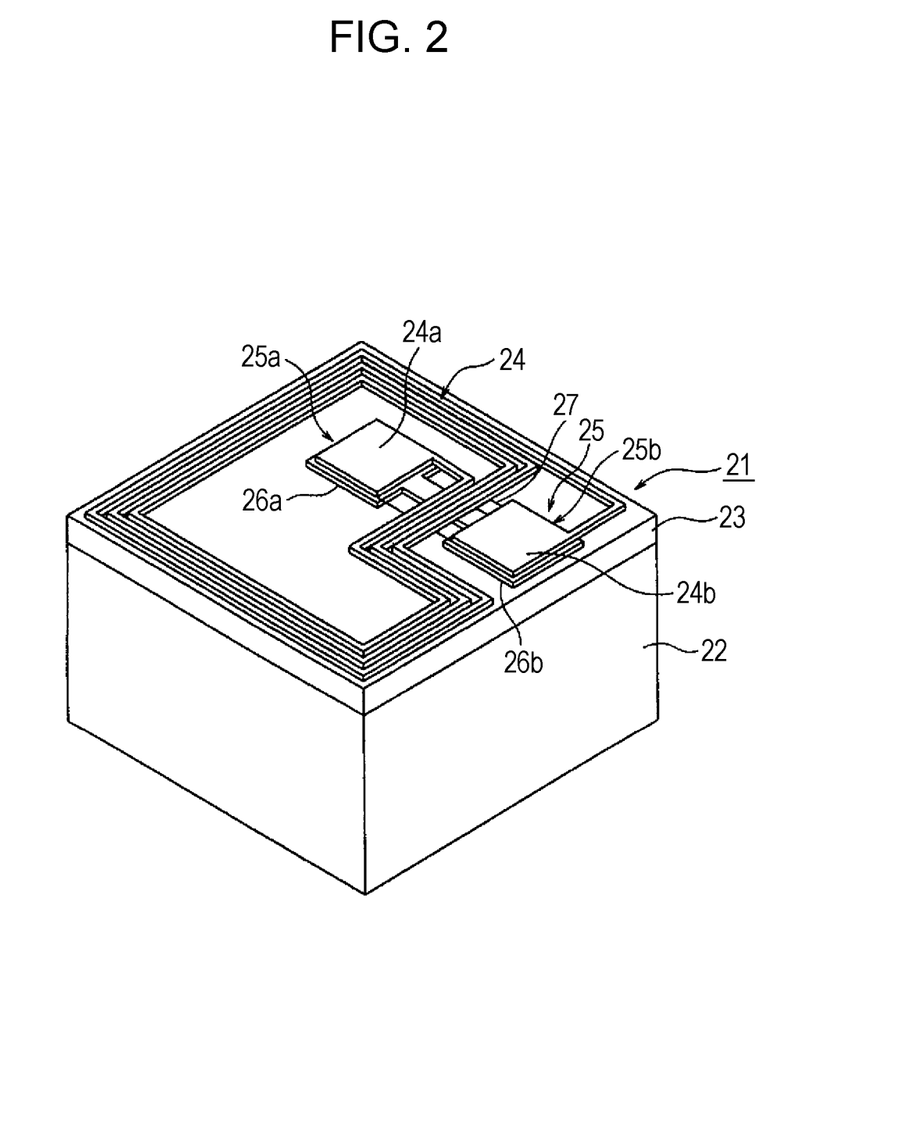
FIG. 2 is a perspective view of a single RF powder particle.
Figure 3:
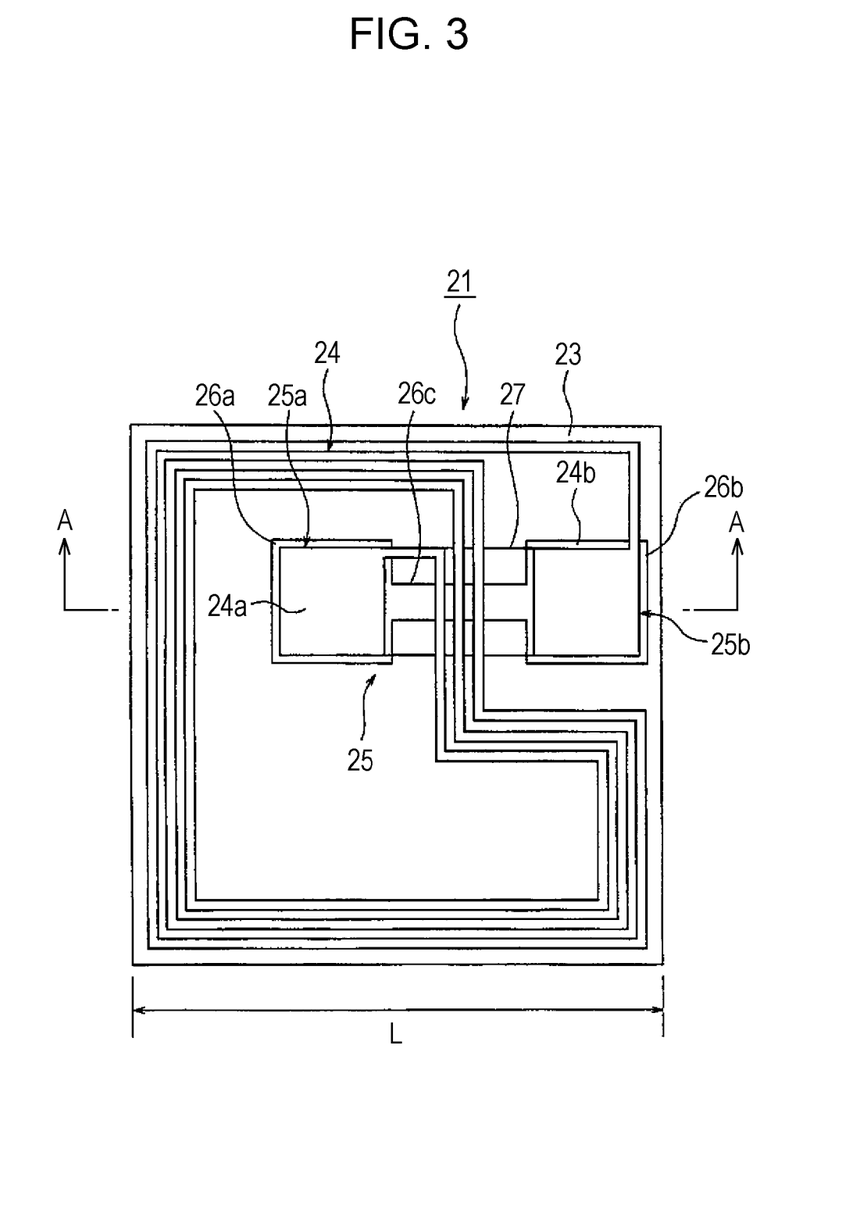
FIG. 3 is a plan view of the single RF powder particle.

FIG. 2 is an external perspective view of an RF powder particle; FIG. 3 is a plan view of the RF powder particle; and FIG. 4 is a sectional view taken along line A-A in FIG. 3. The thickness of the RF powder particle shown in the profile of FIG. 4 is exaggerated.

The RF powder particle 21 shown in FIG. 2 is preferably in a cubic shape or a similar platy rectangular parallelepiped shape. A plurality of rectangular planes defining the external surface of the RF powder particle have such three-dimensional shapes as the rectangular plane having the longest side measures 0.30 mm squares or less, and more preferably 0.15 mm squares or less. The RF powder particle 21 of the present embodiment has a square shape in plan view as shown in FIG. 3. The RF powder particle 21 in a square shape shown in FIG. 3 has sides, each having a length L of, for example, 0.15 mm (150 μm).

In the RF powder particle 21, an insulating layer 23 ($SiO_2$ or the like) is formed on, for example, a silicon (Si) substrate 22, and a plural-turn coil 24 (inductance element) and a capacitor 25 (capacitance element) are formed on the insulating layer 23 by a film-forming technique. The insulating layer 23 has a thickness of, for example, about 10 μm. The capacitor 25 includes two portions 25a and 25b.

The coil 24 and the capacitor 25 formed on the insulating layer 23 respond to a high frequency magnetic field having a specific frequency (for example, 2.45 GHz). As shown in FIGS. 2 and 3, the coil 24 is defined by, for example, three turns of a single conductor wire running along the four sides of the square in plan view of the RF powder particle 21. The conductor wire of the coil 24 is made of, for example, copper (Cu). The coil 24 has square pads 24a and 24b having a predetermined area at both ends. The two pads 24a and 24b are located in an inner region and an outer region with the intersections of the coil 24 therebetween. The two pads 24a and 24b are connected to each other in the direction perpendicular to the intersections of the coil 24. The pads 24a and 24b function as upper electrodes of the two portions 25a and 25b of the capacitor 25, respectively.

The number of turns, the length, and the shape of the coil 24 can be designed so as to obtain easily a specific frequency required for the size of the powder used.

The capacitor 25 of the present embodiment includes, for example, two capacitor elements 25a and 25b. The capacitor element 25a includes the upper electrode 24a and a lower electrode 26a (aluminum (Al) or the like) separated by an insulating layer 27 ($SiO_2$ or the like). The lower electrode 26a has substantially the same shape as the upper electrode 24a. The upper electrode 24a and the lower electrode 26a are electrically isolated from each other by the insulating layer 27. The capacitor element 25b also includes the upper electrode 24b and a lower electrode 26b separated by the insulating layer 27. The lower electrode 26b has substantially the same shape as the upper electrode 24b, and the upper electrode 24b and the lower electrode 26b are electrically isolated from each other by the insulating layer 27 as in the above case.

The respective lower electrodes 26a and 26b of the capacitor elements 25a and 25b are connected to each other with a conductor wire 26c. The two lower electrodes 26a and 26b and the conductor wire 26c are formed in one body in practice. The insulating layer 27 of the capacitor elements 25a and 25b is formed as a single common layer. The insulating layer 27 has a thickness of, for example, 30 nm. The insulating layer 27 electrically isolates the conductor wire 26c connecting the lower electrodes 26a and 26b from the coil 24 in the region between the two capacitor elements 25a and 25b.

According to the structure described above, the capacitor 25 including the two capacitor elements 25a and 25b electrically connected in series is connected between both ends of the coil 24. A tank circuit (LC resonant circuit) is defined by the coil 24 and the capacitor 25 that are connected so as to form a loop. The tank circuit responds to a high frequency electromagnetic field having a frequency equal to the resonance frequency of the tank circuit.

Figure 4:
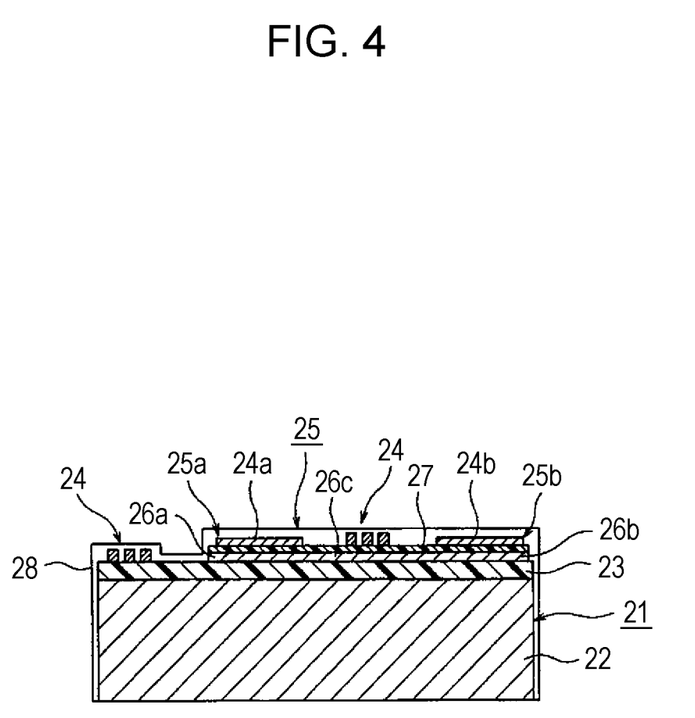
FIG. 4 is a sectional view taken along line A-A in FIG. 3.

As is clear from FIG. 4, the entire surface of the RF powder particle 21 is covered with a P-SiN film 28. The P-SiN film 28 protects the surface of the RF powder particle 21 having the tank circuit.

Although the capacitor 25 includes the two capacitor elements 25a and 25b, it is not limited to this structure and may be constituted of either of the capacitor elements. The capacitance of the capacitor 25 can be appropriately varied by adjusting the area of the electrode. It may be set by disposing a plurality of capacitors in parallel.

Since the thus structured RF powder particle 21 includes the tank circuit including the plural-turn coil 24 and the capacitor 25 that are connected in a loop manner on the insulated surface of the substrate 22 having a given size, the RF powder particle 21 responds to a high frequency magnetic field depending on the designed resonance frequency of the tank circuit. Thus, the RF powder particle 21 is a "powder circuit element" having a designed size and a designed resonance frequency and resonating by coupling with a high frequency magnetic field.

The coil 24 and the capacitor 25 formed on the insulating layer 23 are not electrically connected to the surface of the substrate 22 with a conductor. More specifically, a contact hole is not formed in the insulating layer 23 formed on the substrate 22, and hence, conductor wiring is not formed. The tank circuit including the coil 24 and the capacitor 25 is electrically isolated from the silicon substrate 22. The tank circuit including the coil 24 and the capacitor 25 functions as a resonant circuit by itself, Isolated from the substrate 22.

The substrate 22 as a base of the RF powder particle 21 is made of silicon, and is provided with the insulating layer 23 over the surface thereof. As an alternative to the silicon substrate, a substrate made of a dielectric (insulative) material, such as glass, a resin, or a plastic, may be used. If a glass substrate or the like is used, the insulating layer 23 is not necessary because the material of such a substrate is intrinsically insulative (dielectric).

The RF powder particle 21 is not limited to the shape and structure shown in FIG. 2, and may be arbitrarily modified.

It will now be described with reference to FIGS. 5 to 7 how an RF powder-added sheet 10 according to an embodiment of the present invention is used in practice and how the RF powder-added sheet 10 functions.

As described with reference to FIG. 1, the sheet 10, such as money paper, has a quite number of RF powder particles (11). The thickness of the sheet 10 shown in FIG. 5 is exaggerated. For adding the RF powder particles 11 to the sheet 10, a letter is written on a surface of the sheet 10 with an aqueous solution (ink or paint) containing an adhesive and the RF powder. Thus, the RF powder is fixed onto the surface of the sheet 10.

The base 10 is scanned by a reader 32 connected to a computer 31. The computer 31 reads frequency dependence data of the response of the RF powder particles 11 thereinto. The computer 31 includes a body 31b processing the data, a display device 31a, and a key board 31c for operation.

Figure 6:
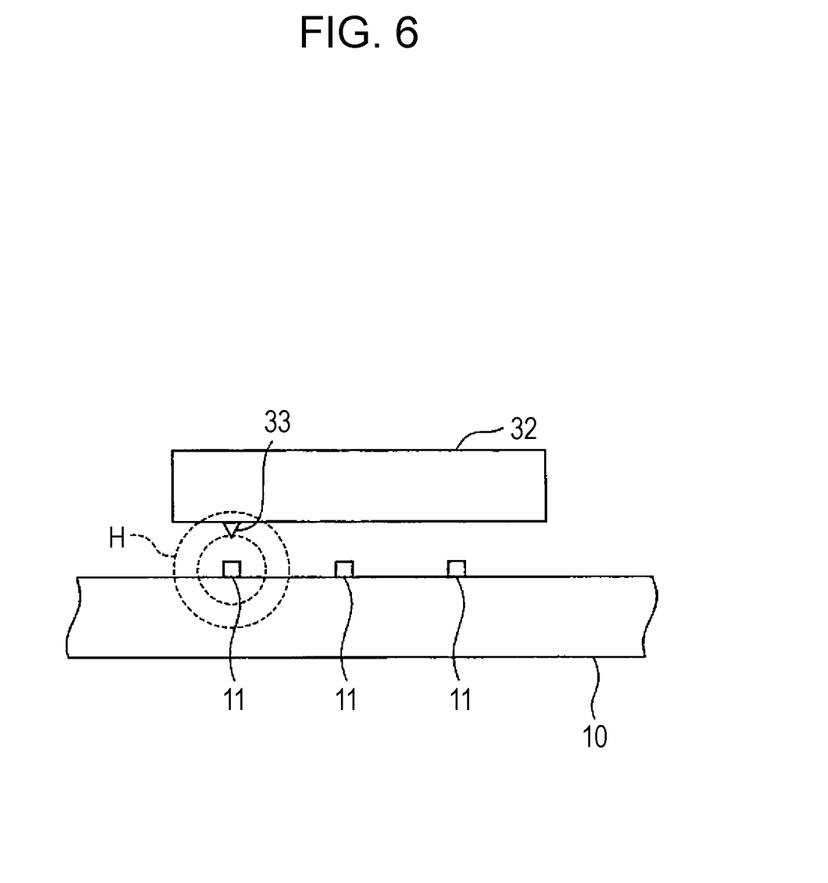
FIG. 6 is a schematic representation of signal exchanges between a reader and an RF powder-added sheet.
Figure 7:
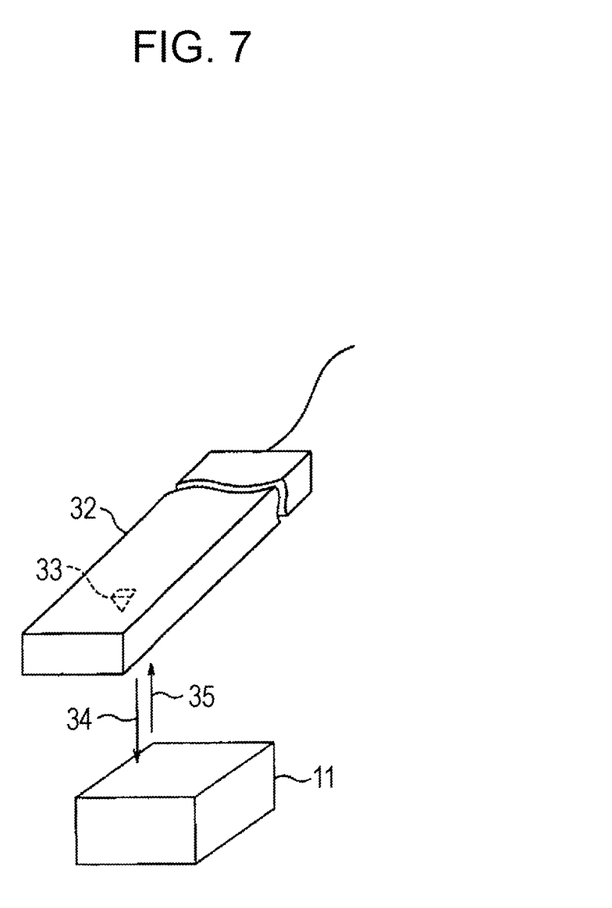
FIG. 7 is representation of transmission/reception of a high frequency electromagnetic field between a single RF powder particle and a reader in a region where the RF powder particle is present.

The reader 32 includes a reading probe 33 (see FIGS. 6 and 7). The reading probe 33 produces a high frequency electromagnetic field in the vicinity thereof and is coupled with the RF powder (large number of RF powder particles 11) by magnetic field coupling. An RF powder particle having a natural frequency of, for example, 2.45 GHz resonates in a high frequency electromagnetic field having a frequency of the same 2.45 GHz and an electromagnetic energy is transmitted to the RF powder particle. In order to efficiently transmit the electromagnetic energy, it is required that the coil of the RF powder particle be present so close to the electromagnetic field generated by the reading probe 33 that they can be sufficiently coupled with each other. In order to establish an efficient coupling in a space, it is preferable that their respective coils have substantially the same size and be apart from each other with a distance substantially equal to the size of the coils. The presence of resonance can be checked by measuring reflectance because if a loss of energy transmitted to a circuit occurs and the energy is not returned from the circuit, the reflectance is reduced. In order to detect the natural oscillation frequency of 2.45 GHz of the RF powder particle, the frequency of the reading probe 33 is varied in the range of 1 to 3 GHz. The reader 32 scans over the surface of the base 10 with a specific distance kept so that a magnetic coupling can be established to determine the position of the RF powder particle.

FIG. 6 schematically shows a state in which when a high frequency field having a specific frequency is generated from the reading probe 33 of the reader 32, a resonance current flows to the coil of the tank circuit of the RF powder particle 11 having a natural oscillation frequency equal to or close to the specific frequency and an electromagnetic field H around the RF powder particle 11 is generated. This state may be expressed as response in the description of the present embodiment. Emission of electromagnetic waves can be neglected because the RF powder particle is quite shorter (0.15 mm) than wavelengths (for example, 15 cm in a 2 GHz-band). The transmission, reflection, and loss of the high frequency energy from the reading probe 33 are performed with a magnetic field coupling.

FIG. 7 shows a state in which an RF powder particle 11 is magnetically coupled to transmit and reflect an energy, in the region where it is present. The reader 32 is moved to scan, so that the reading probe 33 is located over the RF powder particle 11. The reading probe 33 generates a high frequency magnetic field therearound while the frequency is varied, in a predetermined range. When the frequency becomes close to or equal to the natural oscillation frequency of the RF powder particle 11, a current flows in the tank circuit of the RF powder particle including the coil and the capacitor through the magnetic field coupling at the same frequency. Thus, energy is transmitted (indicated by an arrow 34 shown in FIG. 7). The current consumes part of the transmitted (or received) energy as heat in the circuit. Thus, the heat is an energy loss component. The energy loss component can be measured as the decrease of the reflection component (indicated by arrow 35 in FIG. 7) from the viewpoint of the reading probe 33. When the frequency is equal to the natural frequency, the largest loss occurs and the reflection component is reduced. The reader 32 transmits the resonance frequency obtained by this measurement as frequency data information of the powder 11, and the positional information of the reading probe 33, to a computer 31. The computer 31 stores the information including the frequency data and transmits the frequency data of the base sheet as required.

Figure 5:
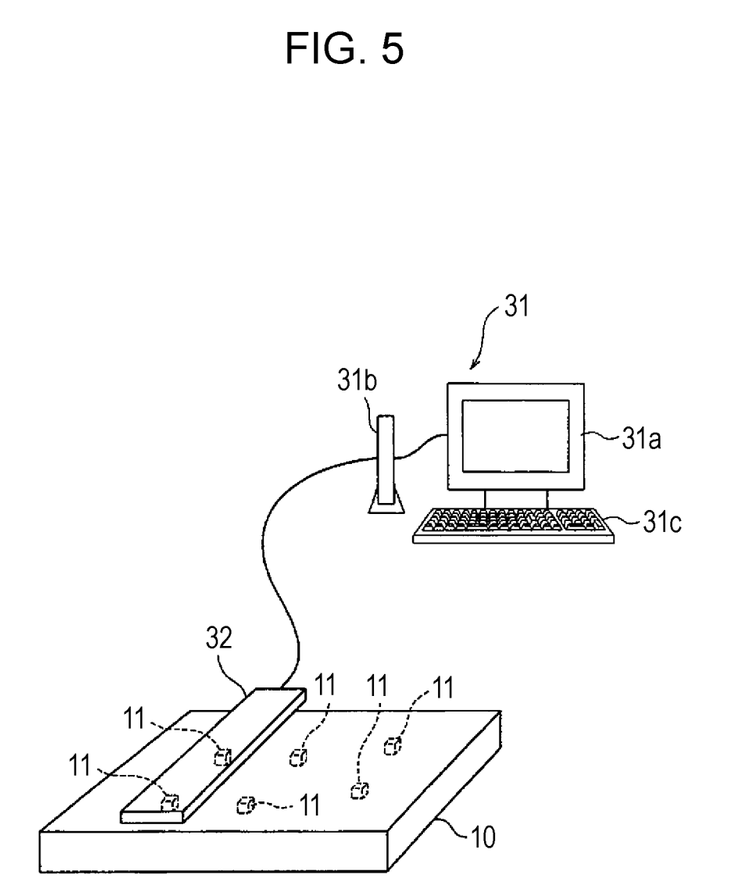
FIG. 5 is a structural representation illustrating a manner in which the RF powder-added sheet may be used and a function of the RF powder-added sheet.

By scanning of the reader 32 over the entire surface of the sheet 10 shown in FIG. 5, the positional data and frequency data of each RF powder particle 11 which presents over the entire scanning region of the sheet 10 are stored in the memory of the computer 31. The information stored in the memory of the computer 31 is processed as required and displayed in a display device 31a. The letter or figure written with the RF powder particles 11 is also read and stored.

The RF powder particles 11 can be used for, for example, identifying counterfeit bills and certifying important documents by disposing the RF powder particles 11 on the surface of paper money, or by adding the RF powder particles 11 into important documents, such as public documents, or into important cards, such as licenses and insurance cards, according to the above method. In this instance, a plurality of or a large number of RF powder particles are collectively treated as a powder, but not as respective IC tag chips, and are accordingly easy to treat.

If the RF powder-added sheet 10 is a paper money, it can be determined whether the paper money 10 is counterfeit, according to the information displayed on a display device 31a.

For producing the RF powder-added sheet 10, an RF powder is prepared by mixing a large number of RF powder particles 11 produced in a predetermined RF powder manufacturing process in an appropriated proportion, and the RF powder is added to a sheet 10. The RF powder particles may be added to the sheet 10 by, for example, printing a paper money with a color ink containing an adhesive containing a predetermined number of RF powder particles 11 and a pigment. Thus, the RF powder particles 11 can adhere to a specific surface.

While the RF powder-added sheet is described as a paper money to clearly show the effect thereof in the present embodiment, it may be document paper, a name card, or a plastic card, such as a credit card. As long as, for example, a paper includes an RF power, even if nothing is written on the surface, an image can be displayed on a screen of a computer, according to the locations of RF powder particles and the frequency data of a high frequency electromagnetic field to which the RF powder particles respond, by reading the paper with a reader.

While a single type of RF powder particles 11 are used on or in a sheet 10 in the present embodiment, one or more types of RF powder particles may be used without being limited to the embodiment.

If a plurality of types of RF powder are used, RF powder particles have substantially the same structure as the above-described RF powder particle 11 and are designed so that the tank circuits thereof respond to high frequency electromagnetic fields having different frequencies.

While a plurality of types of RF powder particles may further be disposed on or in the sheet by design, RF powder particles having, by chance, a distribution of frequency to which the RF powder responds may be disposed on or in the sheet.

Figure 8:
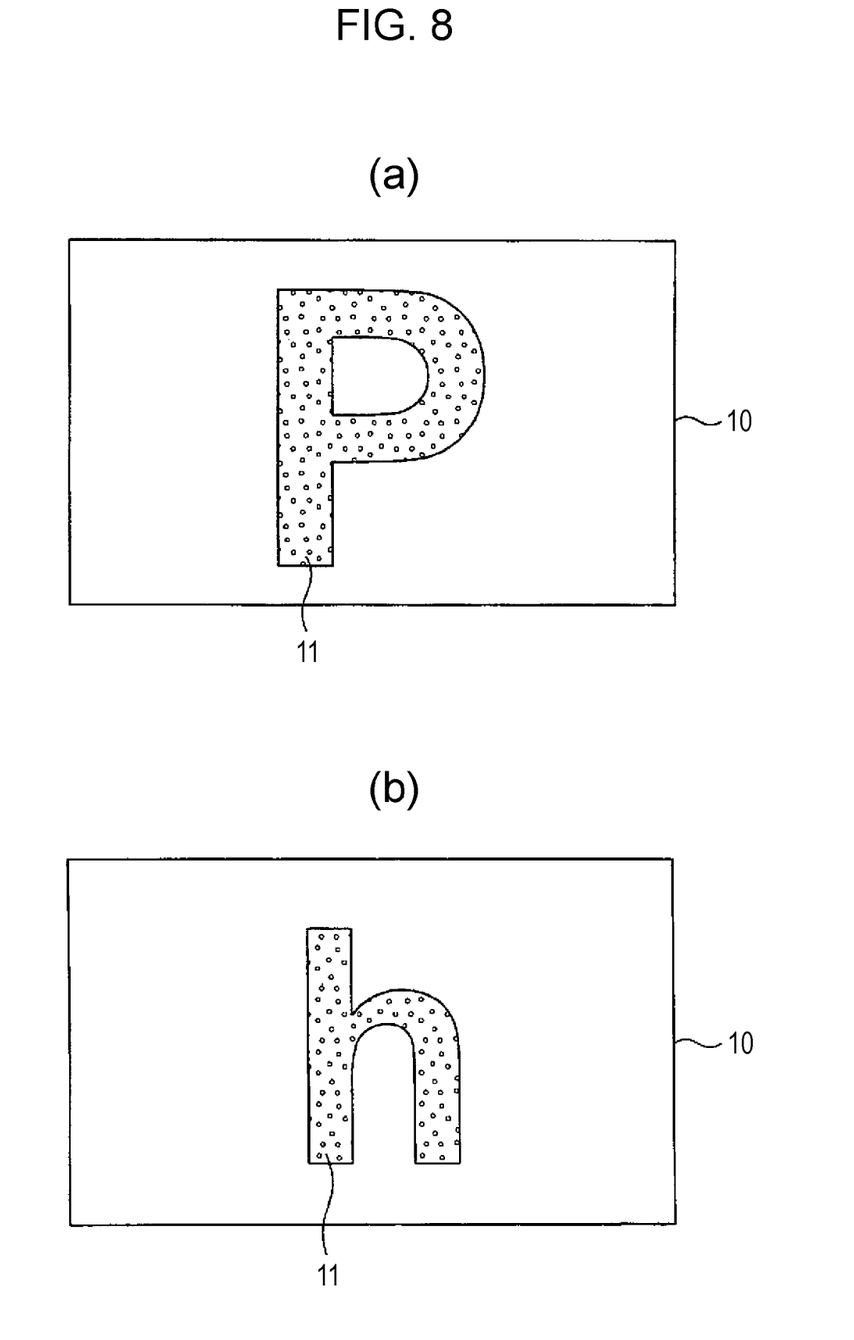
FIG. 8 is a plan view of an RF powder-added sheet according to a second embodiment of the invention.

FIGS. 8(a) and 8(b) are plan views of an RF powder-added sheet according to a second embodiment of the present invention. FIG. 8(a) shows the right side of the sheet and FIG. 8(b) shows the reverse side of the sheet. A type of RF powder particles 11 are disposed on the right side and the reverse side of the sheet 10, which is made of paper. In the present embodiment, for example, a paper money is used as an assumed example of the sheet 10. The RF powder particles 11 are disposed on the right side and the reverse side together with a color print ink so as to form a shape representing a letter or a figure. In FIG. 8, a letter "P" is written on the right side and a letter "h" is written on the reverse side. The RF powder particles 11 respond to a high frequency electromagnetic field having a single frequency. This embodiment is the same as the first embodiment except that the RF powder particles 11 are disposed on both sides of the sheet 10, and the same RF powder as in the first embodiment is used. Data can be read from the RF powder particles 11 in the same manner as in the first embodiment.

Figure 9:
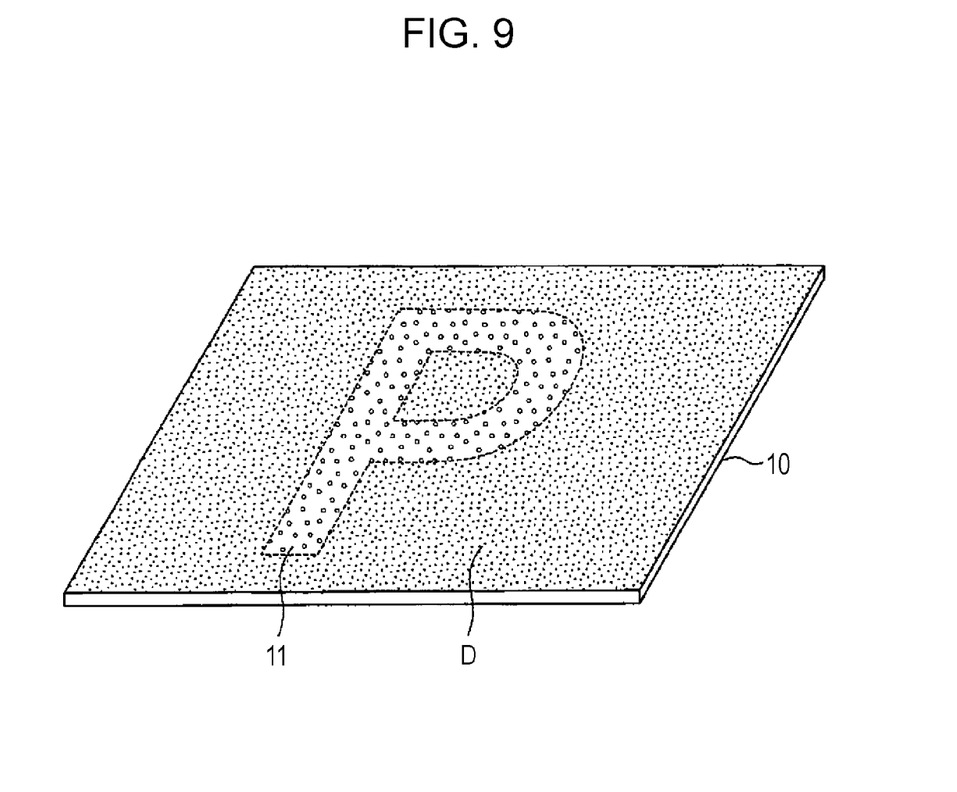
FIG. 9 is a perspective view of an RF powder-added sheet according to a third embodiment of the invention.

FIG. 9 is a perspective view of an RF powder-added sheet according to a third embodiment of the invention. FIG. 9 shows an exemplary state in which a single type of RF powder particles 11 are disposed on a sheet 10 together with, for example, silicon particles D used as dummy RF powder particles. In this embodiment, a paper money is used as a sheet 10 satisfying the assumed requirements. RF powder particles 11 are disposed together with silicon particles D on a surface of the sheet 10 or in the sheet 10. The RF powder particles 11 are disposed so as to form a letter or a figure. In FIG. 9, a letter "P" is written as an example. However, it cannot be visually shown whether the letter P is written or not because silicon dummy particles D are disposed on the surface of the sheet as well. The RF powder particles 11 respond to a high frequency electromagnetic field having a single frequency. This embodiment is the same as the first embodiment except that the RF powder particles 11 are disposed together with silicon dummy RF powder particles D on a surface of the sheet 10.

While, in the above-described embodiments, RF powder particles are disposed so as to form a letter or a figure, RF powder particles may be disposed so as to form a bar code. In such a case, both the bar code information and the frequency data of RF powder particles can be used.

INDUSTRIAL APPLICABILITY

The RF powder-added sheet of the present invention can be used for prevention against counterfeiting bills or other imitations.

REFERENCE NUMERALS

10 RF powder-added base sheet (sheet)
11 RF powder particle
21 RF powder particle
22 substrate
23 insulating layer
24 coil
25 capacitor
31 computer
32 reader

The invention claimed is:

1. A method for adding a radio frequency (RF) powder including a plurality of RF powder particles, each RF powder particle having a magnetic field coupling antenna circuit element including an inductive element and a capacitive element and that responds to a high frequency electromagnetic field having a specific frequency, the method comprising:
disposing the RF powder on a surface of a base sheet to add the RF powder to the base sheet; and
disposing a plurality of dummy RF powder particles on the surface of the base sheet, wherein the plurality of dummy RF powder particles is configured to not respond to any electromagnetic fields, and wherein an appearance of the plurality of dummy RF powder particles mimics an appearance of the plurality of RF powder particles.

2. The method for adding the RF powder according to claim 1, wherein the RF powder is disposed on the surface of the base sheet by a printing technique.

3. The method for adding the RF powder according to claim 2, wherein the RF powder is disposed on the surface of the base sheet together with a print ink having a specific color.

4. The method for adding the RF powder according to claim 2, wherein the RF powder is disposed on the surface of the base sheet within a region defined by an object drawn in the ink.

5. The method for adding the RF powder according to claim 4, wherein the object is a letter, a numeral, or a code.

6. The method for adding the RF powder according to claim 1, wherein the RF powder is disposed on both surfaces of the base sheet.

7. The method for adding the RF powder according to claim 1, wherein the RF powder is disposed so as to be embedded in the surface of the base sheet.

8. The method for adding the RF powder according to claim 1, wherein the plurality of RF powder particles included in the RF powder respond to the same frequency, and hence the specific frequency is set to a single value.

9. The method for adding the RF powder according to claim 1, wherein the plurality of RF powder particles included in the RF powder respond to different frequencies, and hence a plurality of frequencies are set.

10. The method for adding the RF powder according to claim 1, wherein the appearance of the plurality of dummy RF powder particles mimics the appearance of the plurality of RF powder particles to inhibit a person from visually discerning between the plurality of dummy RF powder particles and the plurality of RF powder particles.

11. The method for adding the RF powder according to claim 1, wherein the disposing the RF powder on the surface of the base sheet comprises disposing the RF powder in a pattern, and wherein the disposing the plurality of dummy RF powder particles on the surface of the base sheet comprises disposing the plurality of dummy RF powder particles on the surface of the base sheet in a manner that inhibits a person from visually discerning the pattern of the plurality of RF powder particles.

12. A radio frequency (RF) powder-added base sheet comprising:
an RIP powder including a plurality of RF powder particles disposed on a surface of a base sheet, wherein each RF powder particle includes a magnetic field coupling antenna circuit element comprising an inductive element and a capacitive element, and wherein the magnetic field coupling antenna circuit element is configured to respond to a high frequency electromagnetic field having a specific frequency; and
a plurality of dummy RIP powder particles disposed on the surface of the base sheet, wherein the plurality of dummy RF powder particles is configured to not respond to any electromagnetic fields, and wherein an appearance of the plurality of dummy RF powder particles mimics an appearance of the plurality of RF powder particles;
wherein the RF powder is disposed on the surface of the base sheet in a state in which the RF powder is included in a printed object.

13. The RF powder-added base sheet according to claim 12, wherein the printed object has a specific color.

14. The RF powder-added base sheet according to claim 12, wherein the printed object is a letter, a numeral, or a code.

15. The RF powder-added base sheet according to claim 12, wherein the printed object is provided at both surfaces of the base sheet.

16. The RF powder-added base sheet according to claim 12, wherein the RF powder is disposed so as to be embedded in the surface of the base sheet.

17. The RF powder-added base sheet according to claim 12, wherein the plurality of RF powder particles included in the RF powder respond to the same frequency, and hence the specific frequency is set to a single value.

18. The RF powder-added base sheet according to claim 12, wherein the plurality of RF powder particles included in the RF powder respond to different frequencies, and hence a plurality of frequencies are set.

19. The method for adding the RF powder according to claim 1, wherein the magnetic field coupling antenna circuit element comprises a coil and a capacitor.

20. The RF powder-added base sheet according to claim 12, wherein the magnetic field coupling antenna circuit element comprises a coil and a capacitor.

21. The method for adding the RF powder according to claim 1, wherein the magnetic field coupling antenna circuit comprises a tank circuit, wherein the tank circuit comprises:
a first capacitor connected to a first end of a coil; and
a second capacitor connected to a second end of the coil.

* * * * *

UNITED STATES PATENT AND TRADEMARK OFFICE
CERTIFICATE OF CORRECTION

PATENT NO. : 8,766,853 B2  
APPLICATION NO. : 12/516497  
DATED : July 1, 2014  
INVENTOR(S) : Yuji Furumura et al.

Page 1 of 1

It is certified that error appears in the above-identified patent and that said Letters Patent is hereby corrected as shown below:

On the Title Page, Item (75), under "Inventors", on Line 2, delete "Tokyo (JP);" and insert -- Chiyoda, Tokyo (JP); --, therefor.

In the Claims

In Column 10, Line 12, delete "RIP" and insert -- RF --, therefor.

In Column 10, Line 20, delete "RIP" and insert -- RF --, therefor.

Signed and Sealed this  
Twenty-third Day of September, 2014

Michelle K. Lee  
*Deputy Director of the United States Patent and Trademark Office*